(12) United States Patent
Kochura et al.

(10) Patent No.: US 11,461,405 B2
(45) Date of Patent: Oct. 4, 2022

(54) TECHNOLOGY BASED COMMONALITY DETECTION SYSTEM

(71) Applicant: INTERNATIONAL BUSINESS MACHINES CORPORATION, Armonk, NY (US)

(72) Inventors: Nadiya Kochura, Bolton, MA (US); Fang Lu, Billerica, MA (US); Anh Uong, Topsfield, MA (US); Hanna Yang, Allston, MA (US); Esther Kim, Westford, MA (US); Lincoln A Alexander, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 376 days.

(21) Appl. No.: 16/740,614

(22) Filed: Jan. 13, 2020

(65) Prior Publication Data

US 2021/0216558 A1 Jul. 15, 2021

(51) Int. Cl.
*G06F 16/9035* (2019.01)
*G06V 40/20* (2022.01)

(52) U.S. Cl.
CPC .......... *G06F 16/9035* (2019.01); *G06V 40/20* (2022.01)

(58) Field of Classification Search
CPC .............................. G06F 16/9035; G06V 40/20
See application file for complete search history.

(56) References Cited

U.S. PATENT DOCUMENTS

| 8,848,026 | B2 | 9/2014 | DeLand |
| 9,344,518 | B2 | 5/2016 | Kau et al. |
| 10,171,586 | B2 | 1/2019 | Shaashua et al. |
| 10,510,219 | B1* | 12/2019 | Zalewski ............... G06Q 20/12 |
| 10,665,229 | B2* | 5/2020 | Ogata ................. G10L 15/1815 |
| 11,205,193 | B2* | 12/2021 | Kang ................. G06Q 30/0267 |

(Continued)

OTHER PUBLICATIONS

Anonymous, "Facebook Messenger suggests what to talk about with "Conversation Topics" feature", Facebook Messenger, May 29, 2019, 2 pages.

(Continued)

*Primary Examiner* — Jay A Morrison
(74) *Attorney, Agent, or Firm* — Daniel Yeates; Andrew D. Wright; Roberts Calderon Safran & Cole, P.C.

(57) ABSTRACT

A computer-implemented method includes: receiving first sensor data related to a first user; determining locations visited by the first user based on the first sensor data; determining objects with which the first user has interacted based on the first sensor data; determining communication style information of the first user based on the first sensor data; categorizing the determined locations, the determined objects, and the determined communication style information; comparing the categorized determined locations to categorized locations of a second user; comparing the categorized determined objects to categorized objects with which the second user has interacted; comparing, by the computer device, the categorized determined communication style information to categorized communication style information of the second user, the comparing resulting from the second user being within the predetermined distance from the first user; and suggesting to the first user a topic of conversation based on the comparing.

20 Claims, 5 Drawing Sheets

(56) References Cited

U.S. PATENT DOCUMENTS

2012/0058455 A1    3/2012   Lawrence et al.
2015/0156268 A1    6/2015   Lev et al.
2016/0191446 A1    6/2016   Grol-Prokopczyk et al.
2017/0140054 A1    5/2017   Wu et al.
2018/0343219 A1   11/2018   Anderson et al.

OTHER PUBLICATIONS

Mell et al., "The NIST Definition of Cloud Computing", NIST, Special Publication 800-145, Sep. 2011, 7 pages.

* cited by examiner

TECHNOLOGY BASED COMMONALITY DETECTION SYSTEM

BACKGROUND

Aspects of the present invention relate generally to detecting commonality in two users of a system and, more particularly, to detecting commonality and suggesting a topic of conversation based on the commonality.

Many events include many people of differing interests. People generally prefer to interact with other people who share common interests and/or common experiences. Interacting with people that have common interests and/or common experiences can be beneficial to professional goals.

SUMMARY

In a first aspect of the invention, there is a computer-implemented method including: receiving, by a computer device, first sensor data, the first sensor data being related to a first user; determining, by the computer device, locations visited by the first user based on the first sensor data; determining, by the computer device, objects with which the first user has interacted based on the first sensor data; determining, by the computer device, communication style information of the first user based on the first sensor data; categorizing, by the computer device, the determined locations; categorizing, by the computer device, the determined objects; categorizing, by the computer device, the determined communication style information; comparing, by the computer device, the categorized determined locations to categorized locations of a second user, the comparing resulting from the second user being within a predetermined distance from the first user; comparing, by the computer device, the categorized determined objects to categorized objects with which the second user has interacted, the comparing the categorized determined objects resulting from the second user being within the predetermined distance from the first user; comparing, by the computer device, the categorized determined communication style information to categorized communication style information of the second user, the comparing the categorized determined communication style information resulting from the second user being within the predetermined distance from the first user; and suggesting, by the computer device, to the first user a topic of conversation based on the comparing the categorized determined locations, the comparing the categorized determined objects, and the comparing the categorized determined communication style information.

In another aspect of the invention, there is a computer program product, the computer program product comprising one or more computer readable storage media having program instructions collectively stored on the one or more computer readable storage media. The program instructions are executable to: receive first sensor data, the first sensor data being related to a first user; determine locations visited by the first user based on the first sensor data; determine objects with which the first user has interacted based on the first sensor data; determine communication style information of the first user based on the first sensor data; categorize the determined locations; categorize the determined objects; categorize the determined communication style information; compare the categorized determined objects to categorized objects of a second user, the comparing resulting from the second user being within a predetermined distance from the first user; compare the categorized determined communication style information to categorized communication style information of the second user, the comparing the categorized determined communication style information resulting from the second user being within the predetermined distance from the first user; and suggest to the first user a topic of conversation based on the comparing.

In another aspect of the invention, there is system including a processor, a computer readable memory, and one or more computer readable storage media. The system includes program instructions to receive first sensor data, the first sensor data being related to a first user; program instructions to determine locations visited by the first user based on the first sensor data; program instructions to determine objects with which the first user has interacted based on the first sensor data; program instructions to determine communication style information of the first user based on the first sensor data; program instructions to categorize the determined locations; program instructions to categorize the determined objects; program instructions to categorize the determined communication style information; program instructions to compare the categorized determined locations to categorized locations of a second user, the comparing resulting from the second user being within a predetermined distance from the first user; program instructions to compare the categorized determined communication style information to categorized communication style information of the second user, the comparing the categorized determined communication style information resulting from the second user being within the predetermined distance from the first user; and program instructions to suggest to the first user a topic of conversation based on the comparing of the categorized determined locations, and the comparing of the categorized determined communication style information. The program instructions are stored on the one or more computer readable storage media for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
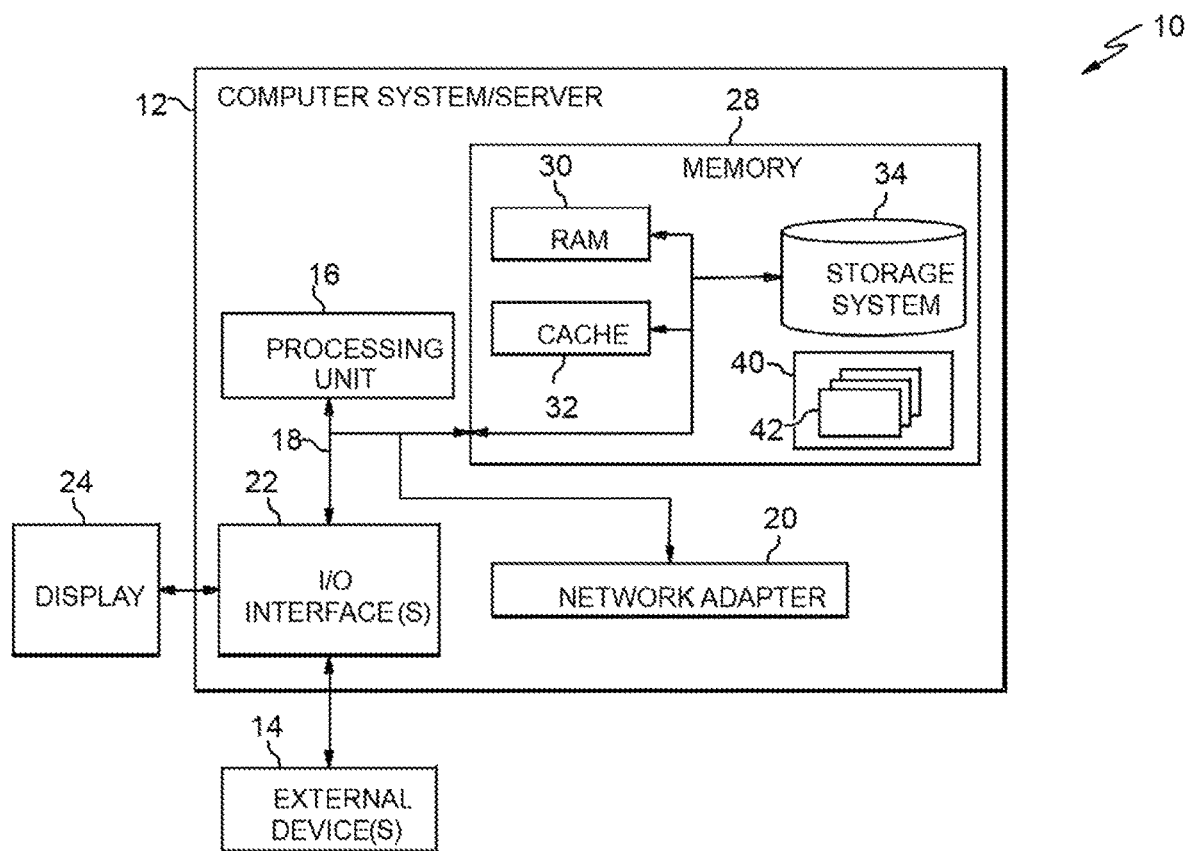
FIG. 1 depicts a cloud computing node according to an embodiment of the present invention.

Aspects of the present invention relate generally to detecting commonality in two users of a system and, more particularly, to detecting commonality and suggesting a topic of conversation based on the commonality. According to aspects of the invention, sensors collect data related to a first user's location, objects the user has interacted with, and communication style information such as, for example, speech patterns, tone of voice, hand gestures, and body language. In embodiments, a computer device categorizes the data and stores the categorized data into a personalized model. The computer device determines when a second user is within a predetermined distance of the first user and compares the first user's personalized model to the second user's personalized model to find matches and/or similarities. The computer device suggests topics for conversation based on the comparison. In this manner, implementations of the invention facilitate meaningful conversations between users.

Implementations of the invention include features that are not well understood, routine, or conventional activity in the relevant art. For example, suggesting to a first user a topic of conversation based on comparing categorized determined locations of the first user to categorized locations of a second user, the comparing resulting from the second user being within a predetermined distance from the first user, is not well-understood, routine, or conventional.

Embodiments of the invention include a system having: a plurality of Internet of Things (IoT) sensors, the plurality of IoT sensors including one or more of a Global Positioning System (GPS) receiver, a camera, and a microphone; and a processor communicatively coupled with the plurality of IoT sensors. The processor is configured to: determine a user's location and objects the user has interacted with based on the data from the plurality of IoT sensors; determine the user's speech patterns, the user's tone of voice, and the user's hand gestures to identify communication style information of the user; categorize the user's determined location, objects, and communication style information; compare the categorized location, objects, and communication style information of the user with categorized location, objects, and communication style information of a second user; and output suggestions to the first user for initiating a conversation with the second user based on the comparison of the categorized location, objects, and communication style information.

Some people find that making conversation with people they do not know is difficult, whether the user is attending a networking event or beginning a meeting with new people. Because social interaction does not come naturally to everyone, a system that, through technology, makes this process easier for people would be beneficial. Knowing what common interests and/or experiences a user has with a person can significantly help the user start a conversation that the other person would find interesting and/or useful.

Embodiments analyze data that is collected from IoT sensors. Embodiments analyze data from IoT sensors focusing on images and GPS data for multiple users and find commonalities between these data sets. Furthermore, embodiments utilize visual recognition to help recognize images and are integrated into digital assistants to help with their speech services and chatbots. Chatbots have a large number of conversations with users and embodiments of the invention help the chatbots to converse with the users.

Embodiments of the invention include a system that can greatly improve communication between two people using, for example, IoT based devices to determine and record: locations the user has visited; objects the user has interacted with; hand gestures and body language that people feel comfortable with; the role the user has played in certain tasks; and tasks the user has performed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
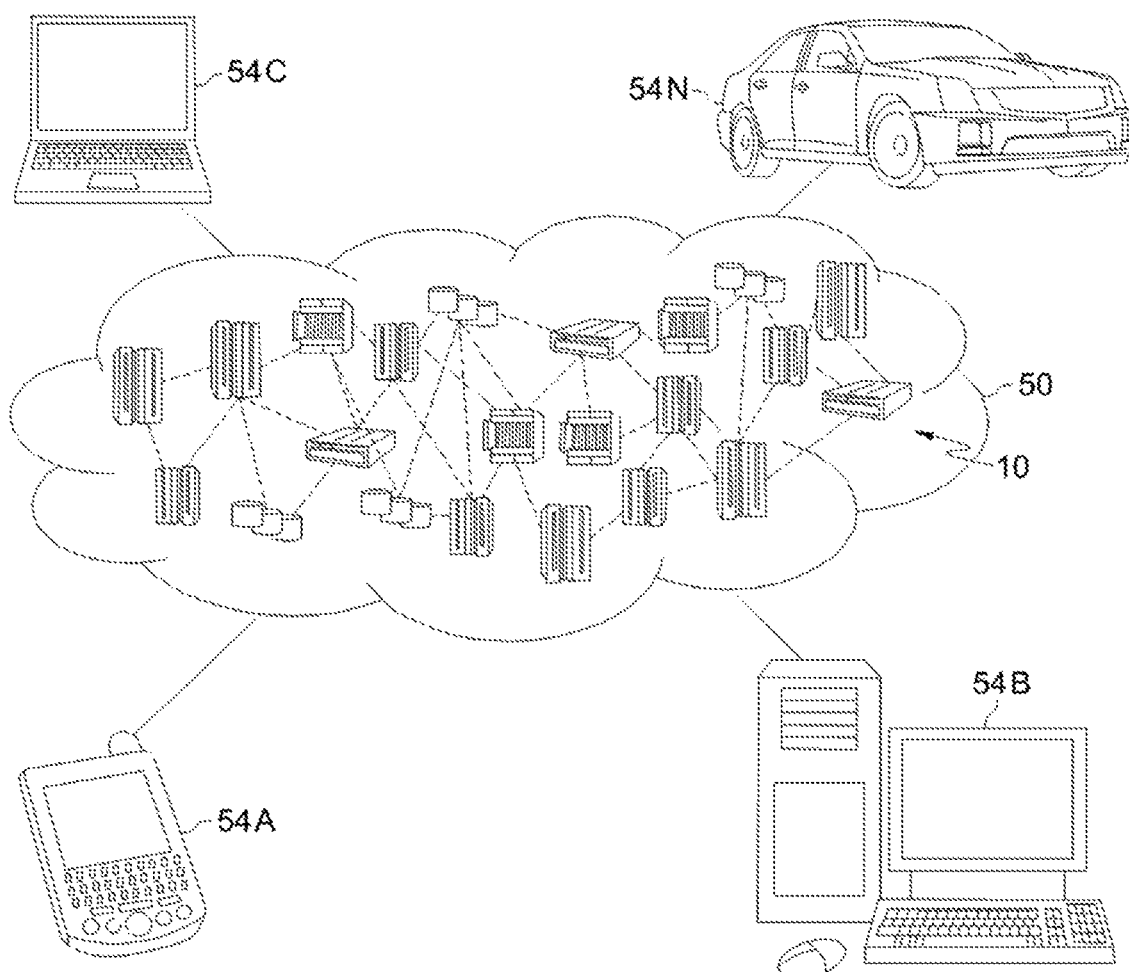
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
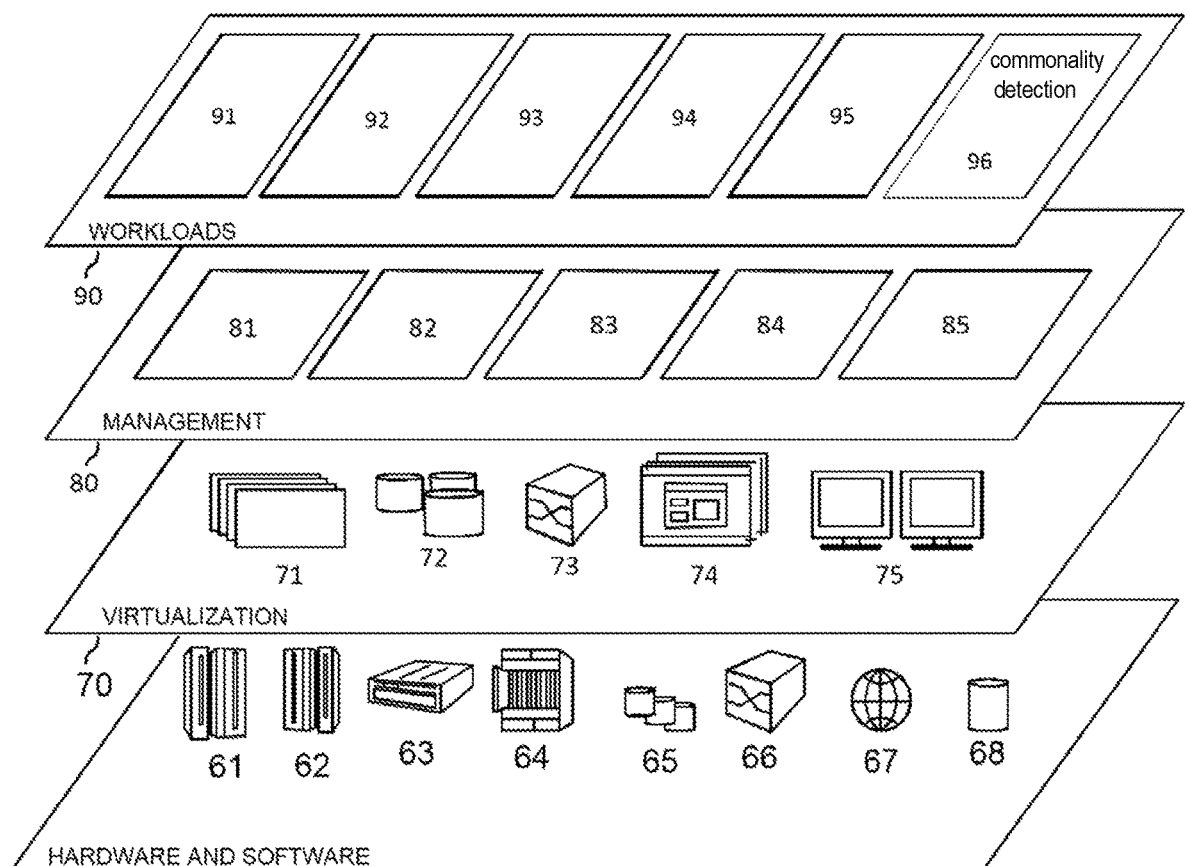
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and commonality detection 96.

Implementations of the invention may include a computer system/server 12 of FIG. 1 in which one or more of the program modules 42 are configured to perform (or cause the computer system/server 12 to perform) one of more functions of the commonality detection 96 of FIG. 3. For example, the one or more of the program modules 42 may be configured to: receive first sensor data, the first sensor data being related to a first user; determine locations visited by the first user based on the first sensor data; determine objects with which the first user has interacted based on the first sensor data; determine communication style information of the first user based on the first sensor data; categorize the determined locations; categorize the determined objects; categorize the determined communication style information; compare the categorized determined locations to categorized locations of a second user, the comparing resulting from the second user being within a predetermined distance from the first user; and suggest to the first user a topic of conversation based on the comparing.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments of the invention system are integrated with IoT sensor-based devices, GPS enabled devices, and camera enabled devices. For example, devices integrated into embodiments include smart phones, tablets, smart watches, virtual assistants, smart glasses, digital cameras, GPS receivers, and other devices that determine and interpret images. Embodiments determine a user's location and the objects the user has interacted with.

Embodiments determine the user's speech patterns, tone of voice, hand gestures, and body language. This set of data is used to analyze certain communication style information such as: whether the user is more outgoing or more unassertive; whether the user tends to avoid certain topics or tends to discuss all topics; whether the user prefers to talk using a quiet voice; whether the user is not comfortable with loud sounds; and whether the user is more comfortable in certain settings.

Embodiments analyze the user's clothing style, including clothing labels and logos, and suggest topics for discussion based on this information that another user might have in common. For example, in embodiments, the analysis shows whether two users shop at the same store or shopping center, attended the same school, or attend meetings of the same club or organization.

Embodiments analyze the raw data and categorize it based on predefined rules. In embodiments, the predefined rules include categories of: locations related to personal events such as birthday parties; attractions repeatedly visited by the user; locations related to professional events such as conference centers, and educational institutes; locations related to hobbies such as sports, volunteering, and pets; foods that the user enjoys; colors the user likes; and types of dress or the style of the clothes worn by the user. In embodiments, the data is categorized based on the rules and stored into a personalized data model.

Embodiments analyze the personal data models of a plurality of users for similarities when two or more of the users are within a predefined distance of each other. For example, when a first user walks into a pre-conference networking session, embodiments of the invention determine what other users are present in the session and compares the personal data models of those users for similarities to the personal data model of the first user.

Embodiments suggest meaningful topics based on the commonalities between the personal data models of the first user and other present users. For example, if the first user and another user both frequent antique car shows, then a system in accordance with embodiments of the invention will suggest that the first user start a conversation about antique cars. In this manner, the invention provides the first user with a certain level of confidence that the other user will be interested in the conversation.

In embodiments, the system filters topic suggestions to help ensure that the suggested topics do not include subjects that may make people in general, or this particular other user, feel uncomfortable. For example, if the personal data model of the other person indicates that the other person has recently stopped visiting pet stores (indicating a recent negative experience with a pet), the system will avoid topics involving pets.

Embodiments prompt the suggested topic on one or more electronic devices of the first user to alert the first user to the topic and to which person the first user should start a conversation with. Embodiments deliver the information using mediums that are preferable to the user, such as, for example, text messages, spoken messages, and/or images.

Embodiments conduct adaptive learning processes to improve the suggested topics based on the outcome of the first user's conversations. For example, embodiments record conversation duration as an indicator of the success or failure of the conversation topic. In embodiments, the users manually enter feedback regarding the suggested topic.

Embodiments automatically generate a user avatar. Embodiments generate, or the user selects, a general avatar for the user and also an event-specific avatar for a specific event. For example, if participants of the event come from different places, the avatar reflects the state or country in which the user lives or works. In embodiments, the user's avatar is visible on devices of other users at the event. In this manner, users can see graphically which users in the event have similar and/or interesting topics in their personal data models. In embodiments, the user manually changes the user's avatar based on other users at the event. For example, if the user sees that a group of other users having a discussion all have an interest in motorcycles, the user changes his/her avatar to a motorcycle. In this manner, the user increases the probability that the other users will welcome the user into their conversation.

Figure 4:
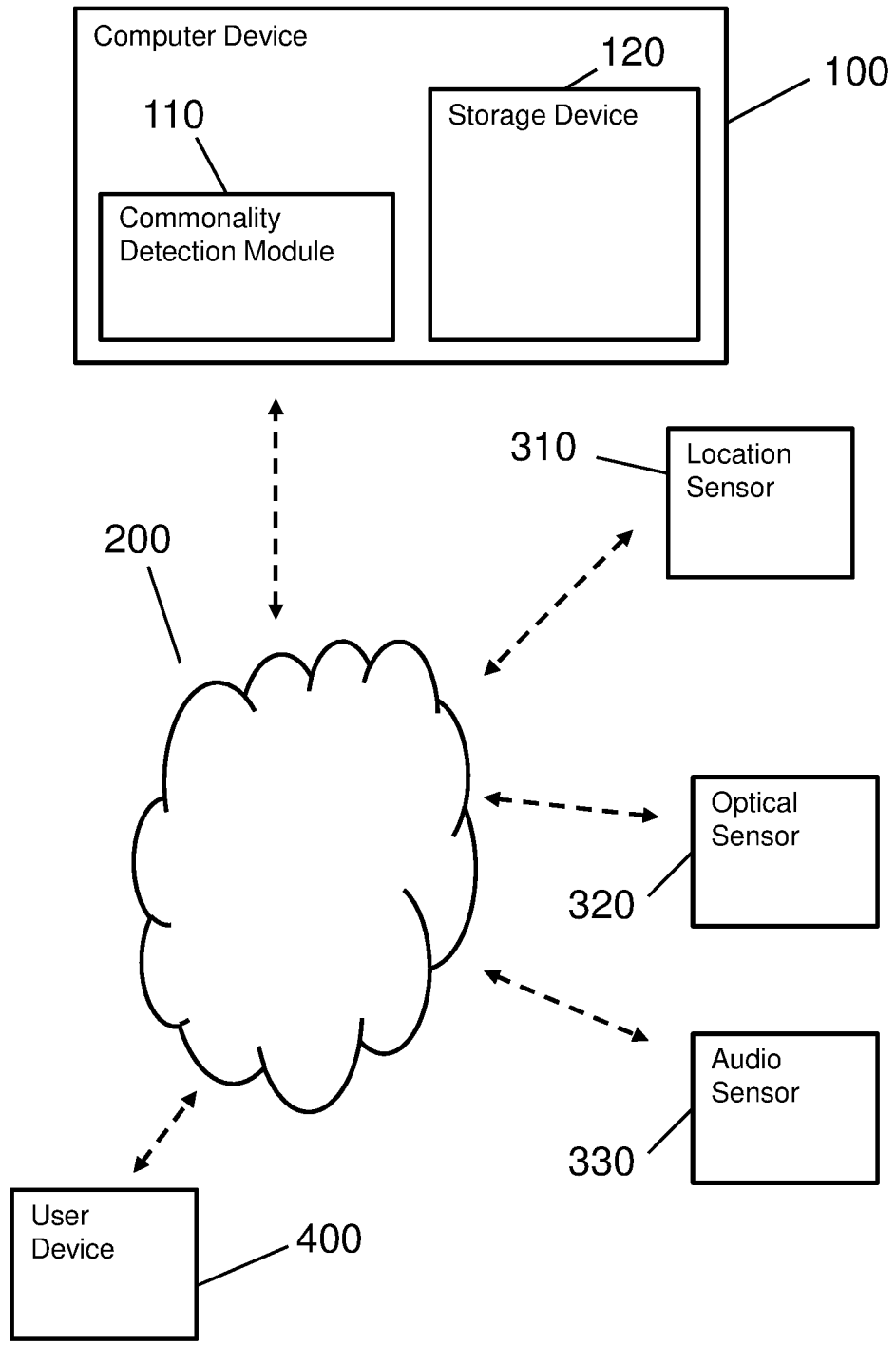
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example cloud computing environment 50. In this example, computer device 100 includes a commonality detection module 110, for example, one or more of program modules 42 in FIG. 1, and a storage device 120 such as, for example, storage system 34 in FIG. 1.

FIG. 4 shows three sensor 310, 320, 330 (other examples have fewer or more than three sensors). In this embodiment, the sensors include a location sensor 310 such as, for example, a GPS receiver, an optical sensor 320 such as, for example, a digital camera, and an audio sensor 330 such as, for example, a microphone. In embodiments, one or more of sensors 310, 320, 330 are incorporated into a user device 400 such as, for example, a smart phone, a smart watch, smart glasses, a tablet, and/or any other device that is connected to other devices through network 200.

Figure 5:
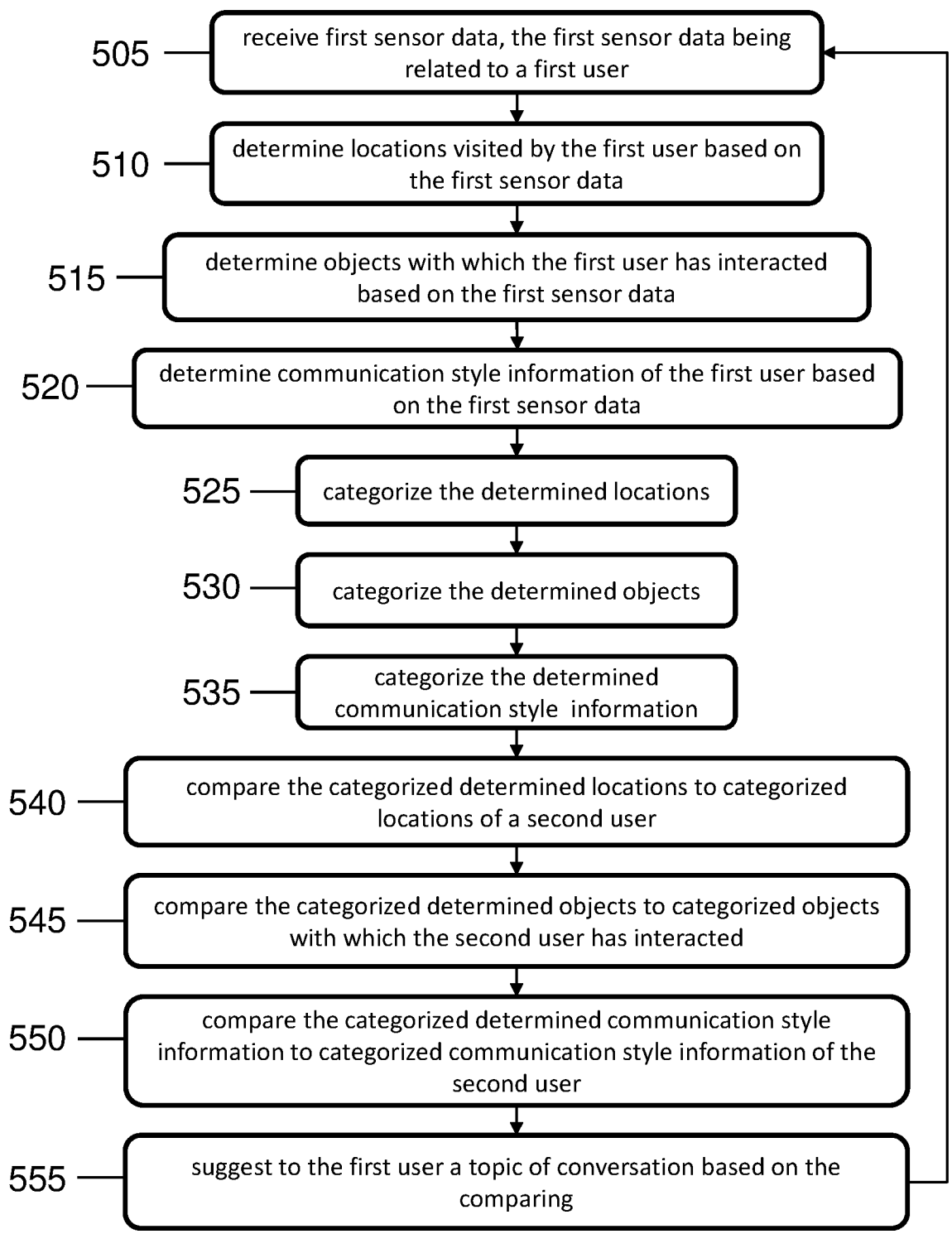
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system receives first sensor data, the first sensor data being related to a first user. In embodiments, commonality detection module 110 receives sensor data from location sensor 310, optical sensor 320, and/or audio sensor 330. For example, optical sensor 320 recognizes a hand gesture made by a first user. In another example, location sensor 310 determines that the first user is located at particular GPS coordinates that coincide with a known landmark.

At step 510, the system determines locations visited by the first user based on the first sensor data. In embodiments, and as described with respect to FIG. 4, commonality detection module 110 determines locations visited by the first user based on location data from locations sensor 310.

At step 515, the system determines objects with which the first user has interacted based on the first sensor data. In embodiments, and as described with respect to FIG. 4, commonality detection module 110 determines objects with which the first user has interacted based on location data from location sensor 310 and/or image data from optical sensor 320. For example, location data from location sensor 310 indicates that the first user is in a museum, and image data from optical sensor 320 matches retrievable image data of a painting by a particular famous artist. Based on the location data and the matching of the image data, commonality detection module 110 determines that the first user is interacting with a painting by the particular famous artist. The object (the painting) is then stored on storage device 120 as part of a personalized data model of the first user.

At step 520, the system determines communication style information of the first user based on the first sensor data. In embodiments, and as described with respect to FIG. 4, commonality detection module 110 determines communication style information of the first user based on voice data from audio sensor 330. For example, audio sensor 330 detects the first user speaking in a higher pitch than is a baseline for the user. Commonality detection module 110 interprets the higher pitch as an indication of excitement. In embodiments, commonality detection module 110 determines that the first user is more outgoing based on the increase in pitch in the first user's voice (indicating excitability and the willingness to verbalize that excitement). In embodiments, commonality detection module 110 combines the indication of excitement with the determination that the first user is interacting with the particular painting in step 515 to store in the first user's personalized data model that the first user enjoys the particular painting and is outgoing.

At step 525, the system categorizes the determined locations. In embodiments, and as described with respect to FIG. 4, commonality detection module 110 categorizes the determined location of the museum as a place that the user enjoys. In embodiments, commonality detection module 110 categorizes the museum as a place that the first user enjoys on a personal level (as opposed to a business level) because, in some situations, and by some users, a museum is considered a place visited for personal reasons as opposed to business reasons.

At step 530, the system categorizes the determined objects. In embodiments, and as described with respect to FIG. 4, commonality detection module 110 categorizes the determined object of the particular painting an object that the first user enjoys. In embodiments, commonality detection module 110 categorizes the particular painting as an object that the first user enjoys on a personal level (as opposed to a business level) because, in some situations, and by some users, a museum is considered a place visited for personal reasons as opposed to business reasons and/or art is considered a subject that is more personal.

At step 535, the system categorizes the determined communication style information. In embodiments, and as described with respect to FIG. 4, commonality detection module 110 categorizes the determined communication style information of the higher pitched voice as an indication that the first user is more outgoing.

At step 540, the system compares the categorized determined locations to categorized locations of a second user. In embodiments, and as described with respect to FIG. 4, commonality detection module 110 compares the categorized determined locations to categorized locations of a second user that is within a predetermined distance from the first user.

At step 545, the system compares the categorized determined objects to categorized objects with which the second user has interacted. In embodiments, and as described with respect to FIG. 4, commonality detection module 110 compares the categorized determined objects to categorized objects of a second user that is within a predetermined distance from the first user.

At step 550, the system compares the categorized determined communication style information to categorized communication style information of the second user. In embodiments, and as described with respect to FIG. 4, commonality detection module 110 compares the categorized determined communication style information (the user is more outgoing) to categorized communication style information of a second user that is within a predetermined distance from the first user.

At step 555, the system suggests to the first user a topic of conversation based on the comparing in step 550. In embodiments, and as described with respect to FIG. 4, commonality detection module 110 suggests to the user a topic of conversation that commonality detection module 110 determines the second user would enjoy and/or be interested in. For example, in a case where commonality detection module 110 determines that the second user enjoys paintings by the artist of the particular painting (observed by the first user in step 515), commonality detection module 110 suggests the artist as a topic of conversation. In embodiments, commonality detection module 110 makes the suggestion in the form of a text message or some other electronic message to an electronic device possessed by the user (for example, a smart phone, a smart watch, or a tablet).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computer device, first sensor data, the first sensor data being related to a first user;
   determining, by the computer device, locations visited by the first user based on the first sensor data;
   determining, by the computer device, objects with which the first user has interacted based on the first sensor data;
   determining, by the computer device, communication style information of the first user based on the first sensor data, wherein the determined communication style information comprises speech patterns of the first user and a tone of voice of the first user;
   categorizing, by the computer device, the determined locations;
   categorizing, by the computer device, the determined objects;
   categorizing, by the computer device, the determined communication style information;
   comparing, by the computer device, the categorized determined locations to categorized locations of a second user, the comparing resulting from the second user being within a predetermined distance from the first user;
   comparing, by the computer device, the categorized determined objects to categorized objects with which the second user has interacted, the comparing the categorized determined objects resulting from the second user being within the predetermined distance from the first user;
   comparing, by the computer device, the categorized determined communication style information to categorized communication style information of the second user, the comparing the categorized determined communication style resulting from the second user being within the predetermined distance from the first user;
   outputting, by the computer device, a suggested topic of conversation to a device of the first user, wherein the suggested topic of conversation is based on the comparing the categorized determined locations, the comparing the categorized determined objects, and the comparing the categorized determined communication style information.

2. The computer-implemented method of claim 1, wherein the suggesting is based on a particular location of the categorized locations of the second user matching a particular location of the categorized determined locations.

3. The computer-implemented method of claim 2, wherein the particular location of the categorized determined locations was visited by the first user a predetermined number of times.

4. The computer-implemented method of claim 2, wherein the particular location of the categorized determined locations was visited by the first user within a predetermined of time of the second user being within the predetermined distance from the first user.

5. The computer-implemented method of claim 1, wherein the suggesting is based on a particular piece of communication style information of the categorized communication style information of the second user matching a particular piece of communication style information of the categorized determined communication style information.

6. The computer-implemented method of claim 5, wherein the suggesting is based on a particular object of the categorized objects with which the second user has interacted being related to a particular object of the categorized determined objects.

7. The computer-implemented method of claim 1, further comprising transmitting, by the computer device, the topic of conversation to an electronic user device of the first user.

8. The computer-implemented method of claim 1, wherein the determined communication style information further comprises:
hand gestures of the first user; and
body language of the first user.

9. The computer-implemented method of claim 1, wherein the determined communication style information further comprises at least one selected from the group consisting of:
a pitch in the first user's voice;
whether the user is more outgoing or more unassertive;
whether the user tends to avoid certain topics; and
whether the user is more comfortable in certain settings.

10. The computer-implemented method of claim 1, further comprising filtering topic suggestions to avoid uncomfortable topics.

11. The computer-implemented method of claim 1, further comprising conducting an adaptive learning process to improve suggested topics based on an outcome of conversations of the first user, based on conversation duration and user feedback.

12. A computer program product, the computer program product comprising one or more computer readable storage media having program instructions collectively stored on the one or more computer readable storage media, the program instructions executable to:
receive first sensor data, the first sensor data being related to a first user;
determine locations visited by the first user based on the first sensor data;
determine objects with which the first user has interacted based on the first sensor data;
determine communication style information of the first user based on the first sensor data, wherein the determined communication style information comprises speech patterns of the first user and a tone of voice of the first user;
categorize the determined locations;
categorize the determined objects;
categorize the determined communication style information;

compare the categorized determined objects to categorized objects of a second user, the comparing resulting from the second user being within a predetermined distance from the first user;
compare the categorized determined communication style information to categorized communication style information of the second user, the comparing the categorized determined communication style information resulting from the second user being within the predetermined distance from the first user; and
output a suggested topic of conversation to a device of the first user, wherein the suggested topic of conversation is based on the comparing.

13. The computer program product of claim 12, wherein the suggesting is based on a particular object of the categorized objects with which the second user has interacted being related to a particular object of the categorized determined objects.

14. The computer program product of claim 13, wherein the first user interacted a predetermined number of times with the particular object of the categorized determined objects.

15. The computer program product of claim 13, wherein the program instructions are further executable to compare the categorized determined locations to categorized locations of the second user, the comparing the categorized determined locations resulting from the second user being within the predetermined distance from the first user,
wherein the suggesting is based on a particular location of the categorized locations of the second user matching a particular location of the categorized determined locations, and
wherein the suggesting is based on a particular piece of communication style information of the categorized communication style information of the second user matching a particular piece of communication style information of the categorized determined communication style information.

16. The computer program product of claim 12, wherein the program instructions are further executable to compare the categorized determined locations to categorized locations of the second user, the comparing the categorized determined locations resulting from the second user being within the predetermined distance from the first user.

17. A system comprising:
a processor, a computer readable memory, and one or more computer readable storage media;
program instructions to receive first sensor data, the first sensor data being related to a first user;
program instructions to determine locations visited by the first user based on the first sensor data;
program instructions to determine objects with which the first user has interacted based on the first sensor data;
program instructions to determine communication style information of the first user based on the first sensor data, wherein the determined communication style information comprises a tone of voice of the first user speech patterns of the first user and;
program instructions to categorize the determined locations;
program instructions to categorize the determined objects;
program instructions to categorize the determined communication style information;
program instructions to compare the categorized determined locations to categorized locations of a second user, the comparing resulting from the second user being within a predetermined distance from the first user;
program instructions to compare the categorized determined communication style information to categorized communication style information of the second user, the comparing the categorized determined communication style information resulting from the second user being within the predetermined distance from the first user; and
program instructions to output a suggested topic of conversation to a device of the first user, wherein the suggested topic of conversation is based on the comparing of the categorized determined locations, and the comparing of the categorized determined communication style information,
wherein the program instructions are stored on the one or more computer readable storage media for execution by the processor via the computer readable memory.

18. The system of claim 17, wherein the suggesting is based on a particular piece of the categorized communication style information of the second user matching a particular piece of the categorized determined communication style information.

19. The system of claim 18, further comprising program instructions to compare the categorized determined objects to categorized objects with which the second user has interacted, the comparing the categorized determined objects resulting from the second user being within the predetermined distance from the first user.

20. The system of claim 19, wherein the particular piece of the categorized determined communication style information comprises the tone of voice of the first user.

* * * * *